No. 676,107. Patented June 11, 1901.
H. P. WELLMAN.
FARM GATE.
(Application filed Oct. 15, 1900.)
(No Model.)

Witnesses,
Mahlon Unger.
L. A. Minturn

Inventor
Harvey P. Wellman,
By Joseph A. Minturn
Attorney.

THE NORRIS PETERS CO., PHOTO-LITHO., WASHINGTON, D. C.

UNITED STATES PATENT OFFICE.

HARVEY P. WELLMAN, OF RUSHVILLE, INDIANA.

FARM-GATE.

SPECIFICATION forming part of Letters Patent No. 676,107, dated June 11, 1901.

Application filed October 15, 1900. Serial No. 33,184. (No model.)

*To all whom it may concern:*

Be it known that I, HARVEY P. WELLMAN, a citizen of the United States, residing at Rushville, in the county of Rush and State of Indiana, have invented certain new and useful Improvements in Farm-Gates, of which the following is a specification.

This invention relates to improvements in gates to close openings in fences through which vehicles pass; and the object is to provide a gate that will not sag, that will not be affected in its working by snow-drifts, that will not open toward the party desiring to pass through, that cannot be opened by live stock, that has no latch to break nor springs to weaken, and that is simple, cheap, durable, and strong.

I accomplish this object by the mechanism illustrated in the accompanying drawings, in which—

Figure 1:
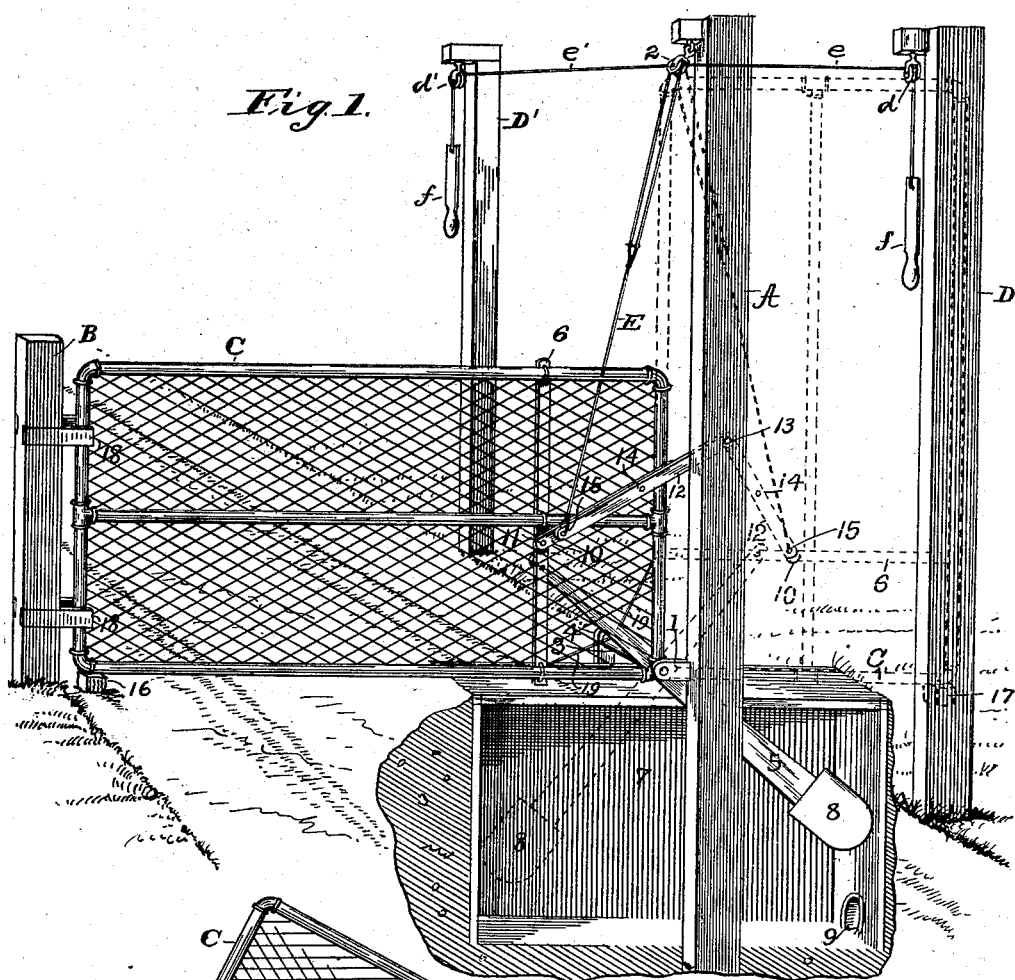
Figure 2:
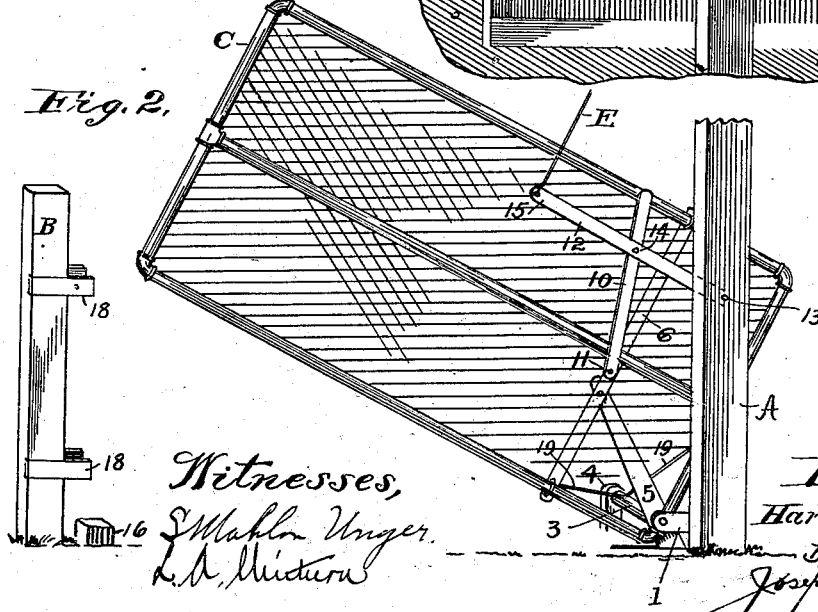

Figure 1 is a perspective view of my improved gate in closed position in full lines and in open position in dotted lines. The ground is broken away in part to show the lever and weight to balance the gate and the box containing said lever and weight. Fig. 2 is a detail in side elevation, showing the gate in partly-opened position.

Like characters of reference indicate like parts in both views of the drawings.

A represents the post to which the gate is hung. It has a bracket 1, extending out into the roadway a few inches, and has the block 2, with a double sheave at its top.

B is the post on the opposite side of the driveway, which holds the front end of the gate when the gate is closed.

C is the gate, which may be of any usual and well-known construction, the gate here shown being one with an iron-pipe frame with a woven-wire filling; but a wooden or other form of gate might be used. An axle 3 is journaled at one end to the bracket 1 and at the other end to a small post 4. The lower corner of the gate is secured to this axle and swings in a vertical plane on the same, and secured to this lower corner of the gate and to the axle is the diagonal lever 5, having a weighted outer end. This lever is attached to the rigid bar 6 of the gate and extends some three and a half feet into a boxed chamber 7, buried in the ground by the side of post A.

The weight 8 on the outer and lower end of the lever 5 is nearly, but not quite, heavy enough to balance the weight of the gate and enables the gate to be raised from a horizontal to a vertical position with the exercise of but very little power. Should there be any danger of the box 7 filling with water and freezing to interfere with the free movement of the lever 5, the water can be removed through a tile-drain 9, which may drain into a dry well if the natural topography of the country does not afford a convenient lower level.

10 is a lever pivoted to the gate at 11, and 12 is a lever pivoted to the post at 13. The two levers are pivoted together at 14.

D and D' are posts on either side of the post A by the roadway. They support top sheaves d and d', over which the cables e and e' pass. The outer ends of these cables have the hand-pulls f, while the inner ends of said cables pass over the double sheaves in block 2 and unite in the single cable E, which attaches to the end 15 of lever 12. A pull on either cable e or e' will raise the point 15, and thus draw the points 11 and 13 together and raise the gate in the manner shown in Fig. 2. When the points 11 and 13 meet, the momentum of the gate will carry the points past each other, and as the gate is a little heavier than the weight 8 it will of itself at once assume the position shown in dotted lines in Fig. 1, that being the open position. When the gate is open and when it is closed, the pivotal points of the two levers 10 and 12 are in a straight line, making a lock which cannot be undone without pulling on cable e or e'; but the gate can be opened when closed or closed when open by pulling down on the hand-pulls on either of the cables e or e'.

The front end of the gate rests on the short post or buffer 16 when the gate is closed, and the unsupported edge of gate rests on a similar post 17 when open. Cleats or brackets 18, in pairs, secured to opposite sides of post B, form stops to prevent the displacement of the free end of the gate, which drops down between the members of the pairs when closed.

19 represents brace-rods extending from the gate to the axle.

The operation of my improved gate is obvious without further explanation.

Having thus fully described my invention, what I claim as new, and wish to secure by Letters Patent of the United States, is—

1. The combination with a post of a gate pivoted at its lower corner to swing in a vertical plane, a pair of bars or levers pivoted together between their ends one of said bars being pivoted at one of its ends to the gate and the other of said bars being pivoted at its outer end to the post, and a cable attached to the inner end of said last-mentioned bar, said cable being in two parts above the gate, suspended from pulleys and extended laterally from the gate, as and for the purposes specified.

2. The combination of a post, a gate pivotally secured at its lower corner to have a swinging movement in a vertical plane, a counterweight on the opposite side of the pivot nearly balancing the gate, a two-part lever consisting of a pair of flat-sided bars connected by a pivot intermediate of their ends, one end of said two-part lever being pivotally secured to the gate and the other end being pivotally secured to the post and a cable connected to the free end of that bar of the two-part lever which is pivoted to the post, said cables being divided into two parts passing laterally from the gate and hangers to support the said parts, substantially as described and shown.

In witness whereof I have hereunto set my hand and seal at Melbourne, Victoria, this 1st day of May, A. D. 1900.

HARVEY P. WELLMAN. [L. S.]

Witnesses:
CHARLES HARKETT,
THOMAS A. W. WHISTER.